United States Patent [19]
Moore

[11] 3,919,390

[45] Nov. 11, 1975

[54] PROCESS AND COMPOSITION FOR CLEANING HOT FUEL GAS

[75] Inventor: Raymond H. Moore, Richland, Wash.

[73] Assignee: The United States of America as represented by the Secretary of the Interior, Washington, D.C.

[22] Filed: July 12, 1974

[21] Appl. No.: 488,082

[52] U.S. Cl. ............ 423/210.5; 423/232; 423/242; 423/563
[51] Int. Cl. .............................. B01d 53/34
[58] Field of Search............. 423/210.5, 232, 242

[56] References Cited
UNITED STATES PATENTS

| | | | |
|---|---|---|---|
| 3,173,849 | 3/1965 | Shearer | 423/232 X |
| 3,438,722 | 4/1969 | Herédy et al. | 423/210.5 |
| 3,671,185 | 6/1972 | LeFrancois et al. | 423/210.5 |
| 3,754,074 | 8/1973 | Grantham | 423/210.5 |
| 3,794,714 | 2/1974 | Atsukawa et al. | 423/242 |
| 3,817,715 | 6/1974 | Grantham | 423/210.5 X |

*Primary Examiner*—L. Dewayne Rutledge
*Assistant Examiner*—Arthur J. Steiner
*Attorney, Agent, or Firm*—Roland H. Shubert; Donald R. Fraser

[57] ABSTRACT

Fuel gases such as those produced by the gasification of coal are cleaned by treatment with a molten salt composition which comprises calcium carbonate dissolved in alkali metal carbonates. The hot fuel gas is contacted with a molten salt mixture which removes both particulates and sulfur compounds from the gas stream. Cleaning of the gas stream and sulfur removal may be accomplished at the temperature at which it emerges from the gasifier which is usually about 900°C or higher. Spent salt may be regenerated by lowering its temperature to about 500° to 600°C and sparging the molten salt with steam and carbon dioxide.

7 Claims, 1 Drawing Figure

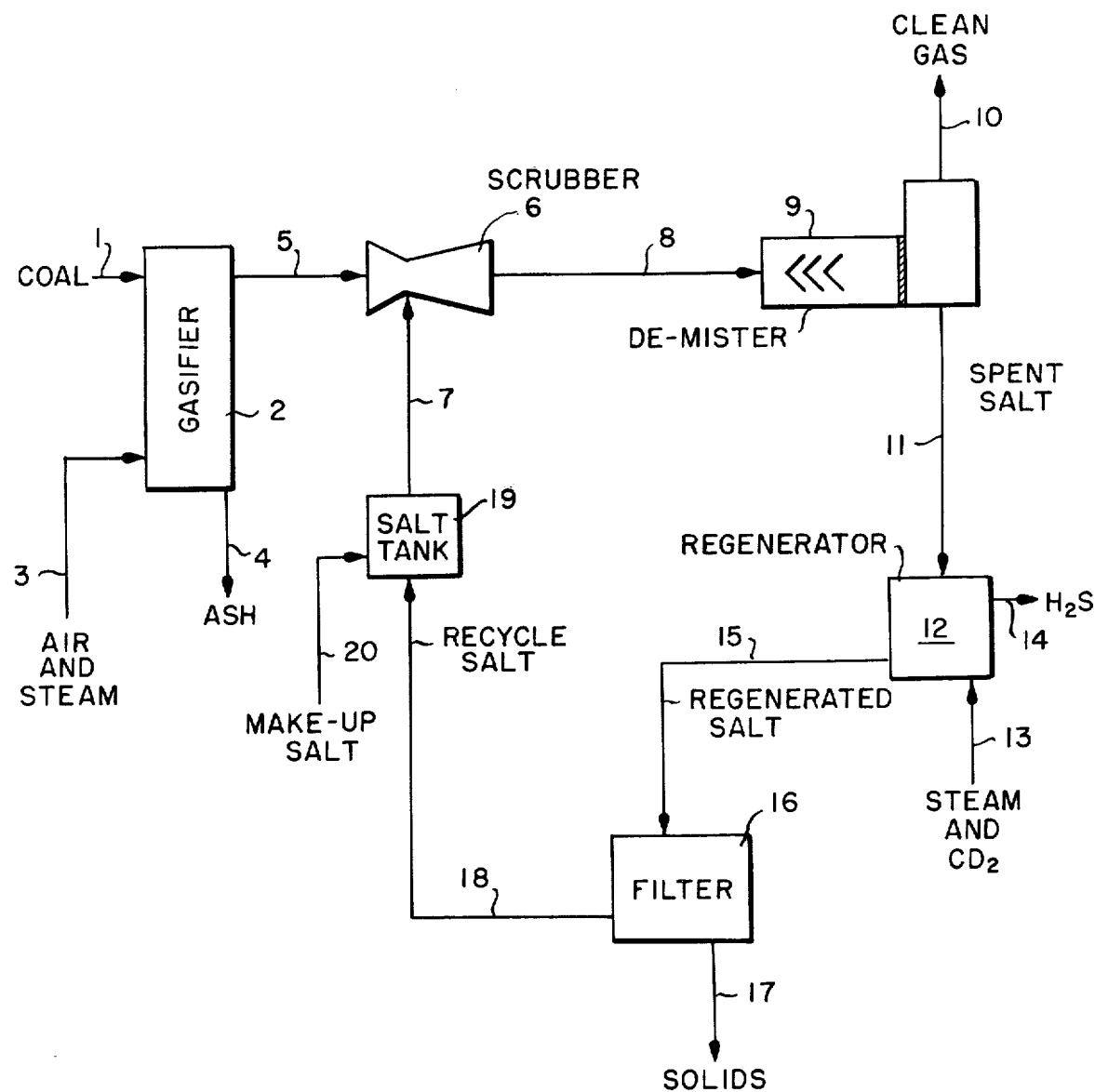

PROCESS AND COMPOSITION FOR CLEANING HOT FUEL GAS

BACKGROUND OF THE INVENTION

Coal may be gasified by contacting it with steam and an oxygen containing gas such as air at temperatures on the order of 800° to 950°C. Such techniques produce a low Btu gas, commonly referred to as producer gas, which contains particulate materials such as ash components of the coal and finely divided char particles in suspension. The gas also contains hydrogen sulfide which is derived primarily from the pyrite contained in the coal. Sulfur is also present in the form of carbonyl sulfide and various organic sulfur compounds.

It is highly desirable to clean the fuel gas at the temperature at which it emerges from the gasifier in order to conserve sensible heat. There are few liquids suitable as working fluids at the high temperature required for gas cleaning. Almost without exception, suitable liquids comprise molten salts. The salt used, however, must have carefully selected properties. These properties are enumerated as follows: (1) The salt must react with hydrogen sulfide and extract this impurity in a reversible manner to permit subsequent regeneration. (2) It must catalyze the hydrogen reduction of carbonyl sulfide so as to form hydrogen sulfide which can then be extracted from the gas. (3) It must be inert to reaction with other fuel gas constituents including hydrogen, carbon monoxide, carbon dioxide, light hydrocarbon gases, nitrogen and water vapor. (4) It should be inert to the inorganic constituents of the particulate matter carried by the gas stream so that these particulates can be removed from the salt by simple hot filtration. (5) The salt must have a sufficiently low vapor pressure that it does not itself contribute impurities to the cleaned fuel gas.

It is known that molten sodium, potassium and lithium carbonates, either singly or in admixture, can be used to remove sulfur compounds including sulfur dioxide and hydrogen sulfide from hot gas streams. Such a process is illustrated by U.S. Pat. No. 3,671,185. It is also known to use a molten ternary mixture of alkali metal carbonates in combination with other non-reactive molten salts such as alkali metal chlorides to scrub sulfur oxides from hot gas streams. This process is illustrated by U.S. Pat. No. 3,438,722.

SUMMARY OF THE INVENTION

This invention relates to a novel composition comprising a molten mixture of calcium carbonate dissolved in alkali metal carbonates and to a process for use of this salt composition in the cleaning of hot fuel gas streams containing particulate materials and hydrogen sulfide as contaminants. A ternary mixture of the carbonates of potassium, lithium and sodium having dissolved therein about 10 to 20 mole % calcium carbonate is preferred.

Incorporation of calcium carbonate in the molten alkali carbonate mixture results in a more efficient extraction of hydrogen sulfide from hot fuel gases over a larger temperature range than is possible using molten alkali metal carbonates alone. Additionally, higher concentrations of moisture and carbon dioxide can be tolerated.

OBJECTS OF THE INVENTION

It is an object of this invention to provide a novel composition of molten salts especially well suited for the extraction of hydrogen sulfide from hot fuel gas streams.

It is another object of this invention to provide an improved method for the removal of hydrogen sulfide and particulate materials from gases.

It is a further object of this invention to provide a process for the purification of fuel gas streams produced by gasification of coal which is operative at the conditions under which the gases are produced.

BRIEF DESCRIPTION OF THE DRAWINGS

The single FIGURE is a flow sheet showing the process of this invention as applied to the cleaning of hot gas streams produced by the gasification of coal.

DETAILED DESCRIPTION OF THE INVENTION

This invention is a method for removing hydrogen sulfide from hot fuel gases, such as those produced by the gasification of coal, and a novel salt composition for use in that process. Salt compositions, useful in the process comprise calcium carbonate dissolved in alkali metal carbonates. A mixture of lithium carbonate, sodium carbonate and potassium carbonate forms a eutectic which melts at about 396°C. This eutectic composition consists of 43.5 mole % lithium carbonate, 31.5 mole % sodium carbonate and 25.0 mole % potassium carbonate. The low melting region around the eutectic point is quite broad so that relatively large changes in compositions of the ternary mixture do not have a marked effect upon the melting temperature. The ternary eutectic composition has been found to dissolve up to about 20 mole % calcium carbonate. It is preferred however to utilize mixed carbonate compositions wherein calcium carbonate is essentially substituted for part of the lithium carbonate. Lithium carbonate is the most expensive component of the salt mixture so a substitution of calcium carbonate for part of the lithium carbonate results in a less expensive composition. However, such a substitution also results in a higher melting point salt composition which may not be advantageous in certain uses of the process. Broadly speaking salt compositions having the following ranges in mole percent are useful in the process; lithium carbonate, 15 to 40%; sodium carbonate, 25 to 40%; potassium carbonate, 25 to 35% and calcium carbonate, 10 to 20%.

The ternary alkali metal carbonate mixtures are quite satisfactory for scrubbing highly acidic gases, such as sulfur dioxide and sulfur trioxide, from hot gas mixtures. The ternary alkali metal carbonates also have some tendency to extract hydrogen sulfide but are most effective at very high temperatures. At lower temperatures, moisture and carbon dioxide contained in the gas stream cause a reversal of the extraction reaction and hydrogen sulfide previously extracted by the salt is thus released. Incorporation of calcium carbonate in the molten salt mixture provides a greater driving force for reaction to form a metal sulfide, in this case calcium sulfide. This means that efficient extraction of hydrogen sulfide from gas streams can be accomplished over a much larger temperature range than with the ternary alkali metal carbonates alone. Additionally much higher concentrations of moisture and carbon dioxide can be tolerated without a reversal of the extraction reaction.

Regeneration of the spent molten salt may be accomplished by reducing the temperature of the salt to a level below the extraction temperature but above the melting point and sparging the molten salt with steam and carbon dioxide. Regeneration may be accomplished at temperatures of about 500° to 600°C. At these temperatures substantially all of the original capacity of the salt for extraction of hydrogen sulfide may be regenerated within a relatively short time with the release of hydrogen sulfide.

In referring now to the FIGURE, there is shown a flow sheet for use of the process in extracting hydrogen sulfide from a hot fuel gas stream produced by the gasification of coal. Coal is fed via line 1 into gasifier 2 wherein it is contacted with air and steam introduced via line 3. The air and steam react with coal in the gasifier to produce an ash fraction 4 and a hot gas stream 5. Fuel gas stream 5 contains hydrogen, carbon monoxide, carbon dioxide, nitrogen, some lower hydrocarbons such as methane and ethane, and water vapor. In addition, the fuel gas stream contains a small amount of hydrogen sulfide, typically on the order of about 0.5%. Temperature of fuel gas stream 5 is that of the gasification reaction which is ordinarily about 800° to 950°C.

Hot fuel gas stream 5, in addition to containing hydrogen sulfide and other sulfur compounds as impurities, contains in an entrained state some particulate matter which comprises inorganic ash constituents of the coal as well as entrained char particles. The hot gas stream is contacted with a molten salt composition comprising alkali metal carbonates with calcium carbonate dissolved therein in scrubber 6. Scrubber 6 may comprise a venturi type scrubber or any other type of gas-liquid contacting means provided that efficient and thorough contacting of the molten salt with the hot fuel gas is accomplished at low pressure drop. In a venturi type scrubber as is illustrated in the drawing, molten salt is introduced by way of line 7 at the venturi throat. The molten salt acts to extract substantially all of the hydrogen sulfide from the hot gas stream, catalyzes the decomposition of carbonyl sulfide to hydrogen sulfide which is then extracted, and scrubs particulate matter from the gas stream.

Issuing from the venturi scrubber is a cleaned gas stream carrying entrained droplets of molten salts. This gas stream is passed via line 8 to a liquid-gas separation device 9 which may conveniently comprise a packed bed and fiber demister A clean gas stream 10, essentially devoid of hydrogen sulfide and particulate matter, is recovered from the demister and may be burned as fuel for a gas turbine or other combustion device or may be subsequently processed to produce a synthetic natural gas.

A spent salt stream 11, recovered from demister 9, is then passed to regeneration means 12. Means 12 comprises a contacting vessel in which the spent molten salt is contacted with steam and carbon dioxide which are introduced via line 13. The steam-carbon dioxide mixture reacts with calcium sulfide contained in the spent molten salt to produce a hydrogen sulfide stream 14 and a regenerated salt stream 15. Stream 15 still carries char and other inorganic particulate material removed from the hot gas stream and scrubber 6. These particulate materials are removed from stream 15 in filter means 16. Particulate material removed from the regenerated salt in filter 16 is passed from the system by way of line 17. Solids 17 may be further treated by extraction with a suitable solvent such as water, in order to recover the alkali metal carbonates associated with the solids. The regenerated salt stream recovered from filter 16 may then be passed by way of line 18 to salt tank 19. Make-up salt is introduced into salt tank 19 by way of line 20. Salt tank 19 comprises a heated vessel from which molten salt is passed to scrubber 6.

A series of experiments were performed in order to demonstrate the differences in performance between a ternary mixture of alkali metal carbonates and a ternary mixture of alkali metal carbonates containing dissolved calcium carbonate for the extraction of hydrogen sulfide from hot fuel gases. Gas-liquid contact was in a simple bubbler which yields, at most, one equibrilium extraction stage. The bubbler held about 1 liter of molten salt and was sparged with humidified and preheated fuel gas at temperatures ranging from 600° to 950°C and at flow rates ranging from 0.2–4:9 liters per minute. Composition of the synthetic fuel gas used in these experiments is set out in the following table.

Table I.

| Composition of Synthetic Fuel Gas | |
|---|---|
| Constituent | Volume Percent (Dry Basis) |
| $H_2$ | 15.0 |
| CO | 20.0 |
| $CO_2$ | 15.0 |
| $N_2$ | 50.0 |
| $H_2S$ | 0.5 |
| $H_2O$* | variable (6–20%) |

EXAMPLE 1

Synthetic fuel gas of the composition set out in Table 1 was bubbled through a fresh quantity of ternary alkali metal carbonates. Contacting temperature was 600°C, gas flow was 4.9 liters per minute, entering water content was 9.1% and a 93.0% extraction of hydrogen sulfide from the gas stream was obtained.

EXAMPLE 2

The ternary mixture of alkali metal carbonates used in example 1 was first reacted with hydrogen sulfide in an amount equal to 6.1% of the capacity of the mixed carbonates. This loaded salt mixture was then contacted with synthetic flue gas at a temperature of 620°C and a gas flow rate of 3.0 liters per minute. Water content of the entering gas stream was 19.7%. Hydrogen sulfide concentration in the exiting gas stream was more than double the concentration of the entering gas stream. Under these conditions, a reversal of the extraction was obtained and hydrogen sulfide previously extracted by the salt was released.

EXAMPLE 3

A mixture of ternary alkali metal carbonates was reacted with hydrogen sulfide in an amount equal to 5.35% of the capacity of the mixed carbonates. The loaded molten salt was then contracted with a synthetic flue gas having the composition set out in Table 1 at a temperature of 725°C and a gas flow rate of 2.7 liters per minute. Water content of the entering gas stream was 13.6%. Hydrogen sulfide extraction amounted to 56.4%.

EXAMPLE 4

A mixture of ternary alkali metal carbonates was reacted with hydrogen sulfide in an amount equal to 10.2% of the capacity of the mixed carbonates. This loaded salt solution was then contacted at a temperature of 725°C with synthetic flue gas having the composition set in Table 1. Gas flow rate was 2.7 liters per minute and water content of the entering gas stream was 13.6%. Hydrogen sulfide content of the exiting gas stream was higher than that of the gas entering the scrubber. At these conditions, there was observed a reversal of the extraction reaction and hydrogen sulfide previously extracted by the salt was released.

EXAMPLE 5

A ternary mixture of alkali metal carbonates was reacted with hydrogen sulfide in an amount equal to 17.8% of the capacity of the mixed carbonates. This loaded salt was then contacted with a synthetic flue gas of the composition set out in Table 1 at a temperature of 810°C. Gas flow rate was 2.3 liters per minute and the entering water content was 6.1%. At these conditions, the hydrogen sulfide extraction obtained was 71.5%.

EXAMPLE 6

A ternary mixture of alkali metal carbonates was reacted with hydrogen sulfide in an amount equal to 27.3% of the capacity of the mixed carbonates. This loaded salt was then contacted with the synthetic fuel gas of Table 1 at a temperature of 930°C. Gas flow rate was 3.7 liters per minute and water content of the entering gas stream was 12.2%. Under these conditions a hydrogen sulfide extraction of 53.1% was observed.

These examples illustrate representative results obtained in the extraction of hydrogen sulfide from a hot fuel gas stream using a molten ternary alkali metal carbonate mixture. As may be observed from the data, the efficiency of the hydrogen sulfide extraction reaction is strongly influenced by the temperature and water content of the fuel gas as well as upon the sulfur loading of the molten salt.

The following examples illustrate the improved performance obtained in the extraction of hydrogen sulfide from hot fuel gases when calcium carbonate is incorporated as a component in the ternary alkali metal carbonate mixture. In these examples, gas-liquid contact was accomplished using the same apparatus as was used in examples 1 to 6. Fuel gas compositions used in the following examples were those set out in Table 1. Salt composition in mole percent was as follows: lithium carbonate 18.0, sodium carbonate 37.3, potassium carbonate 29.6, and calcium carbonate 15.1%.

EXAMPLE 7

A fresh mixture of the quaternary carbonate salts described above was used to scrub a synthetic fuel gas having the composition set out in Table 1, at a temperature of 605°C. Gas flow rate was 2.9 liters per minute, water content of the incoming fuel gas was 13.0% and a hydrogen sulfide extraction greater than 99% was observed.

EXAMPLE 8

The quaternary carbonate salt mixture described above was reacted with hydrogen sulfide in an amount equal to 15.1% of the available calcium carbonate. Fuel gas was then sparged through the molten mixture at a temperature of 730°C at a flow rate of about 2.2 liters per minute. Water content of the entering gas stream was 13.6% and a hydrogen sulfide extraction of 95.6% was observed. This same salt mixture was then reacted with additional hydrogen sulfide in an amount equal to 29.9% of the available calcium carbonate. Scrubbing of the gas mixture was then continued at the same conditions of temperature, flow rate and water content. At these conditions, a hydrogen sulfide extraction of 87.9% was obtained.

EXAMPLE 9

The quaternary carbonate salt mixture previously described was reacted with additional hydrogen sulfide in an amount equal to 80.6% of the available calcium carbonate contained in the salt mixture. This salt mixture was then used to scrub the fuel gas at a temperature of 725°C and a flow rate of 2.3 liters per minute. Water content of the entering gas stream was 13.6% and a hydrogen sulfide extraction of 82.1% was observed. This same quaternary carbonate salt mixture was then reacted with additional hydrogen sulfide in an amount equal to 93.6% of the available calcium carbonate contained in the salt mixture. This salt mixture was then used to scrub additional fuel gas at the same conditions as previously, that is a temperature of 725°C, a flow rate of 2.3 liters per minute and a water content of 13.6%. At these conditions a hydrogen sulfide extraction of 59.8% was obtained.

EXAMPLE 10

The quaternary carbonate salt mixture previously described was reacted with hydrogen sulfide in an amount equal to 31.7% of the available calcium carbonate. This salt mixture was then used to scrub the fuel gas at a temperature of 820°C. Gas flow rate was 2.5 liters per minute and water content of the entering gas was 13.6%. At these conditions, a hydrogen sulfide extraction of 97.0% was obtained. This same salt mixture was then reacted with additional hydrogen sulfide in an amount equal to 63.0% of the available calcium carbonate. This salt mixture was then used to scrub additional quantities of the fuel gas at a temperature of 825°C, a flow rate of 2.1 liters per minute, and an entering water concentration of 13.6%. At these conditions, a hydrogen sulfide extraction of 85.9% was obtained. The salt was then reacted with additional quantities of hydrogen sulfide in an amount equal to 79.6% of the available calcium carbonate. Additional quantities of fuel gas were scrubbed using this salt composition at the same conditions described previously. A hydrogen sulfide extraction of 79.1% was obtained.

EXAMPLE 11

The quaternary carbonate salt mixture described previously was reacted with hydrogen sulfide in an amount equal to 47.0% of the available calcium carbonate contained in the mixture. This molten salt was then used to scrub a quantity of the fuel gas of Table 1. Scrubbing temperature was 920°C, flow rate was 2.4 liters per minute and the entering gas stream had a water content of 13.6%. At these conditions, a hydrogen sulfide extraction of 94.1% was obtained. This molten salt mixture was then reacted with further hydrogen sulfide in an amount equal to 62.3% of the available calcium carbonate contained in the mixture. It was then used to scrub additional quantities of the fuel gas at a temperature of 910°C and a gas flow rate of 2.1 liters per minute. Water content of the entering gas stream was 13.6% and a hydrogen sulfide extraction of 94.3% was obtained.

The data of examples 7 to 11 show that excellent extraction of hydrogen sulfide from a fuel gas stream can be obtained over the entire temperature range of interest provided that no more than about 60% of the available calcium carbonate is consumed. It is important to note also that these data are conservative because most synthetic fuel gases will be substantially lower in both carbon dioxide and water vapor content then the synthetic gas used in these experiments. A reduction in the carbon dioxide and water vapor concentrations results in improved hydrogen sulfide extraction.

EXAMPLE 12

A hydrogen sulfide-loaded quaternary carbonate salt was regenerated at a temperature of 590°C by sparging the molten salt with steam and carbon dioxide in a ratio of 80% steam, 20% carbon dioxide. Assay of the salt before and after regeneration showed that 96% of the orginal capacity was restored in a 4 hour treatment time. Maximum hydrogen sulfide concentration in the gas stream leaving the regenerator was approximately 24% and would be suitable as a feed to a Claus process for conversion to elemental sulfur.

These specific examples illustrate particular embodiments of this invention. These examples are not, however, to be construed as limiting.

I claim:

1. A process for extracting hydrogen sulfide from a hot fuel gas stream which comprises contacting said gas stream with a molten carbonate salt mixture, said carbonate salt mixture consisting essentially of 10 to 20 mole percent calcium carbonate dissolved in a ternary mixture of 25 to 35 mole percent potassium carbonate, 15 to 40 mole percent lithium carbonate, and 25 to 40 mole percent sodium carbonate.

2. The process of claim 1 wherein the gas stream is contacted with the molten carbonate salt at a temperature in the range of 600° to 950°C.

3. The process of claim 2 wherein the hot fuel gas contains particulate matter and wherein said particulate matter is scrubbed from the gas stream by said molten salt.

4. The process of claim 3 wherein hydrogen sulfide and particulate matter are extracted from said hot fuel gas by intimately dispersing droplets of said molten salt in said hot fuel gas and thereafter separating said molten salt, now containing sulfur compounds and particulate matter, from the hot fuel gas stream.

5. The process of claim 4 wherein said molten salt, separated from said hot fuel gas stream, is regenerated by contacting said salt with a mixture of steam and carbon dioxide at a temperature in the range of 500° to 600°C whereby calcium sulfide contained in said molten salt is converted to calcium carbonate with the release of hydrogen sulfide gas.

6. The process of claim 5 wherein said regenerated salt is filtered while in the molten state to remove particulate matter therefrom and is thereafter recycled to again contact said hot fuel gas stream.

7. The process of claim 4 wherein said hot fuel gas stream is the product obtained by the gasification of coal and contains hydrogen, carbon dioxide, carbon monoxide, nitrogen and water vapor.

* * * * *